(12) United States Patent
Hayashi et al.

(10) Patent No.: US 12,185,164 B2
(45) Date of Patent: Dec. 31, 2024

(54) TRANSMITTING-SIDE RELAY APPARATUS, SYSTEM, METHOD, AND NON-TRANSITORY COMPUTER-READABLE MEDIUM

(71) Applicant: NEC Corporation, Tokyo (JP)

(72) Inventors: Yuki Hayashi, Tokyo (JP); Jun Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/641,209

(22) PCT Filed: Sep. 24, 2020

(86) PCT No.: PCT/JP2020/036122
§ 371 (c)(1),
(2) Date: Mar. 8, 2022

(87) PCT Pub. No.: WO2021/060406
PCT Pub. Date: Apr. 1, 2021

(65) Prior Publication Data
US 2024/0056896 A1 Feb. 15, 2024

(30) Foreign Application Priority Data
Sep. 26, 2019 (JP) .................. 2019-175433

(51) Int. Cl.
*H04W 28/22* (2009.01)
*H04W 28/02* (2009.01)

(52) U.S. Cl.
CPC ....... *H04W 28/22* (2013.01); *H04W 28/0257* (2013.01)

(58) Field of Classification Search
CPC ..... H04W 28/22; H04W 28/02; H04W 28/20; H04W 28/06; H04W 28/10; H04W 28/18;
(Continued)

(56) References Cited

U.S. PATENT DOCUMENTS 8,654,641 B2 * 2/2014 Kure ................. H04L 47/30
370/232
9,185,602 B2 * 11/2015 Nakagawa ............ H04L 47/10
(Continued)

FOREIGN PATENT DOCUMENTS

EP 1372304 A2 12/2003
JP 2004-015551 A 1/2004
(Continued)

OTHER PUBLICATIONS

International Search Report for PCT Application No., PCT/JP2020/036122, mailed on Nov. 10, 2020.
(Continued)

*Primary Examiner* — Man U Phan
(74) *Attorney, Agent, or Firm* — Sughrue Mion, PLLC

(57) ABSTRACT

An object of the present disclosure is to provide a transmitting-side relay apparatus, a system, a method, and a program, each adapted to reduce congestions in a network while appropriately using a communication resource for a network-based communication. A transmitting-side relay apparatus according to the present disclosure includes a request rate calculation unit configured to calculate, based on a transmission rate of an input packet, an encoding loss rate at the time of encoding the input packet to generate an encoded packet, and a packet loss rate of the encoded packet in a receiving-side relay apparatus, a request rate of the encoded packet; a permissible rate calculation unit configured to calculate, based on at least one of a delay time indicating a time period from the time of generation of the input packet to the time of reception of the encoded packet.

14 Claims, 9 Drawing Sheets

(58) Field of Classification Search
CPC ..... H04W 72/04; H04W 72/08; H04W 72/54;
H04W 84/04; H04W 84/18; H04W 16/26;
H04L 1/00; H04L 1/16; H04L 1/18;
H04L 1/20; H04L 12/80; H04L 12/82;
H04L 12/84; H04L 12/26; H04L 12/56;
H04L 47/38; H04L 47/12; H04L 47/25;
H04L 47/27; H04L 47/28; H04L 47/32;
H04L 47/56
USPC .......................................................... 370/329
See application file for complete search history.

(56) References Cited

U.S. PATENT DOCUMENTS

| | | | |
|---|---|---|---|
| 9,451,248 B2* | 9/2016 | Imai | H04N 21/23611 |
| 9,954,752 B2* | 4/2018 | Hayashi | H04L 1/1621 |
| 10,129,123 B2* | 11/2018 | Tsuruoka | H04L 43/0876 |
| 10,271,241 B2* | 4/2019 | Kim | H04L 1/203 |
| 10,666,502 B2* | 5/2020 | Togo | H04L 69/40 |
| 11,019,333 B2* | 5/2021 | Miyagoshi | H04N 21/2385 |
| 2012/0166670 A1* | 6/2012 | Kure | H04N 21/6437 |
| | | | 709/233 |
| 2014/0153637 A1* | 6/2014 | Imai | H04N 21/2662 |
| | | | 375/240.02 |
| 2016/0254976 A1 | 9/2016 | Hayashi et al. | |
| 2018/0192453 A1* | 7/2018 | Nishikawa | H04L 69/16 |
| 2019/0394462 A1 | 12/2019 | Miyagoshi et al. | |
| 2021/0273889 A1* | 9/2021 | Osuga | H04L 47/27 |

FOREIGN PATENT DOCUMENTS

| | | |
|---|---|---|
| JP | 2006-051709 A | 2/2005 |
| JP | 2007-166469 A | 6/2007 |
| JP | 2009-278521 A | 11/2009 |
| JP | 2013-191067 A | 9/2013 |
| WO | 2015/060297 A1 | 4/2015 |
| WO | 2018/138934 A1 | 8/2018 |

OTHER PUBLICATIONS

JP Office Action for JP Application No. 2019-175433, mailed on Nov. 4, 2020 with English Translation.
Extended European Search Report for EP Application No. 20867600.7, dated on Sep. 20, 2022.

* cited by examiner

TRANSMITTING-SIDE RELAY APPARATUS, SYSTEM, METHOD, AND NON-TRANSITORY COMPUTER-READABLE MEDIUM

This application is a National Stage Entry of PCT/JP2020/036122 filed on Sep. 24, 2020, which claims priority from Japanese Patent Application 2019-175433 filed on Sep. 26, 2019, the contents of all of which are incorporated herein by reference, in their entirety.

TECHNICAL FIELD

The present disclosure relates to a transmitting-side relay apparatus, a system, a method, and a program, in particular, a transmitting-side relay apparatus, a system, a method, and a program, each adapted to reduce congestion in a network while appropriately using a communication resource for a network-based communication.

BACKGROUND ART

A rateless code is known as an encoding scheme used for leased lines such as wired networks, satellite channels, and the like. In a communication (transfer) method using a rateless code, the transmitting-side apparatus generates an encoded packet by combining a plurality of packets selected randomly from the input packets and transmits the generated encoded packet. The receiving-side apparatus transmits, when the encoded packet can be decoded, ACK for notifying that transmission has been completed to the receiving-side apparatus. The transmitting-side apparatus continues to transmit the encoded packet to the receiving-side apparatus until ACK is received from the receiving-side apparatus. In these leased lines, bandwidth is not limited and so the transmitting-side apparatus generates an unlimited number of encoded packets and transmits the generated encoded packets. This configuration has been causing a congestion in the network.

Here, a case where the rateless code is used in an environment in which the leased lines are not used, for instance, a case where it is applied to a radio network shared by a plurality of users (terminal apparatuses) is studied. In this case, since bandwidth is not limited on the transmitting-side, the transmitting-side apparatus raises the transmission rate of the rateless code until the network gets congested. Then, the transmitting-side apparatus lowers the transmission rate after the network congestion is detected. Further, even when the input rate (the reception rate) of the input packets is low, the transmitting-side apparatus continues to transmit a plurality of encoded packets until the network gets congested, thus using more communication resources (the network resources) than necessary.

Patent Literature 1 discloses, in paragraph 0024, that based on the information on the calculated RTT (Round Trip Time) and the acquired error rate, determination is made as to whether congestions have occurred in the period corresponding to the received feedback information. Further, Patent Literature 1 discloses, in paragraph 0028, that the encoding rate and the FEC rate are determined using the result of determination of the occurrence of congestions and the information on the error rate and the RTT. Patent Literature 1 does not disclose calculating a predetermined transmission rate for transmitting the encoded packets based on the two rates of the request rate of the encoded packets and the permissible rate of the encoded packets.

Patent Literature 2 discloses, in paragraph 0032, that an additional distribution server distributes, using the encoded symbol set B different from the encoded symbol set A which was used in the distribution in phase 1, the encoded symbols of the encoded symbol set B by the number of additional distributions. Further, Patent Literature 2 discloses, in paragraph 0054, that by inserting encoding parameters into each packet and the like, the encoding parameters are changed for each distribution or during distribution. Patent Literature 2 does not disclose that the predetermined transmission rate for transmitting the encoded packets based on the two rates of the request rate of the encoded packets and the permissible rate of the encoded packets is calculated.

Patent Literature 3 discloses, in paragraph 0059, that the packet loss rate and the round trip transmission delay (RTT: Round Trip Time) is calculated. Further, Patent Literature 3 discloses, in paragraph 0070, that the parameter calculation unit finds the probability distribution of the delay time and finds the "number of source packets to be encoded at once", which is the parameter of the rateless code, by substituting the "maximum delay allowance" and the "assurance establishment" input by the user. Patent Literature 3 does not disclose that the predetermined transmission rate for transmitting the encoded packets based on the two rates of the request rate of the encoded packets and the permissible rate of the encoded packets is calculated.

CITATION LIST

Patent Literature

Patent Literature 1: Japanese Unexamined Patent Application Publication No. 2009-278521
Patent Literature 2: Japanese Unexamined Patent Application Publication No. 2007-166469
Patent Literature 3: International Patent Publication No. WO 2015/060297

SUMMARY OF INVENTION

Technical Problem

As described above, there has been a problem that the transmission rate of the rateless code is raised until the network gets congested. Further, there has been a problem that more communication resources (the network resources) than necessary are used.

An object of the present disclosure is to provide a transmitting-side relay apparatus, a system, and a method, and a program each configured to solve any one of the aforementioned problems.

Solution to Problem

A transmitting-side relay apparatus according to the present disclosure includes:
  a request rate calculation unit configured to calculate, based on a transmission rate of an input packet input to the transmitting-side relay apparatus, an encoding loss rate at the time of encoding the input packet to generate an encoded packet, and a packet loss rate of the encoded packet in a receiving-side relay apparatus, a request rate of the encoded packet;
  a permissible rate calculation unit configured to calculate, based on at least one of a delay time indicating a time period from the time of generation of the input packet to the time of reception of the encoded packet by the receiving-side relay apparatus and the packet loss rate, a permissible rate of the encoded packet; and a transmission rate calculation unit configured to calculate a predetermined transmission rate for transmitting the encoded packet based on the request rate and the permissible rate.

A system according to the present disclosure includes:

a transmission terminal apparatus;

a transmitting-side relay apparatus for receiving an input packet from the transmission terminal apparatus and transmitting an encoded packet;

a receiving-side relay apparatus for receiving the encoded packet and transmitting an output packet; and a reception terminal apparatus for receiving the output packet, the transmitting-side relay apparatus including:

a request rate calculation unit configured to calculate a request rate of the encoded packet based on a transmission rate of the input packet input to the transmitting-side relay apparatus, an encoding loss rate at the time of encoding the input packet to generate an encoded packet, and a packet loss rate of the encoded packet in the receiving-side relay apparatus;

a permissible rate calculation unit configured to calculate a permissible rate of the encoded packet based on at least one of a delay time indicating a time period from the time of generation of the input packet to the time of reception of the encoded packet by the receiving-side relay apparatus and the packet loss rate; and a transmission rate calculation unit configured to calculate a predetermined transmission rate for transmitting the encoded packet based on the request rate and the permissible rate, the receiving-side relay apparatus including:

an encoded packet receiving unit configured to receive the encoded packet from the transmission-side relay apparatus;

a decoding unit configured to decode the encoded packet to generate the output packet;

a packet transmitting unit configured to transmit the output packet to the reception terminal apparatus; and an ACK transmitting unit configured to transmit the delay time and the packet loss rate to the transmitting-side relay apparatus.

A method according to the present disclosure includes:

calculating, based on a transmission rate of an input packet input to the transmitting-side relay apparatus, an encoding loss rate at the time of encoding the input packet to generate an encoded packet, and a packet loss rate of the encoded packet in the receiving-side relay apparatus, a request rate of the encoded packet;

calculating a permissible rate of the encoded packet based on at least one of a delay time indicating a time period from the time of generation of the input packet to the time of reception of the encoded packet by the receiving-side relay apparatus and the packet loss rate; and calculating a predetermined transmission rate for transmitting the encoded packet based on the request rate and the permissible rate.

A program according to the present disclosure for causing a computer to execute the processes of:

calculating, based on a transmission rate of an input packet input to a transmitting-side relay apparatus, an encoding loss rate at the time of encoding the input packet to generate an encoded packet, and a packet loss rate of the encoded packet in the receiving-side relay apparatus, a request rate of the encoded packet;

calculating a permissible rate of the encoded packet based on at least one of a delay time indicating a time period from the time of generation of the input packet to the time of reception of the encoded packet by the receiving-side relay apparatus and the packet loss rate; and calculating a predetermined transmission rate for transmitting the encoded packet based on the request rate and the permissible rate.

Advantageous Effects of Invention

According to the present disclosure, it is possible to provide a transmitting-side relay apparatus, a system, a method, and a program, each adapted to reduce congestions in a network while appropriately using a communication resource for a network-based communication.

DESCRIPTION OF EMBODIMENTS

Figure 1:
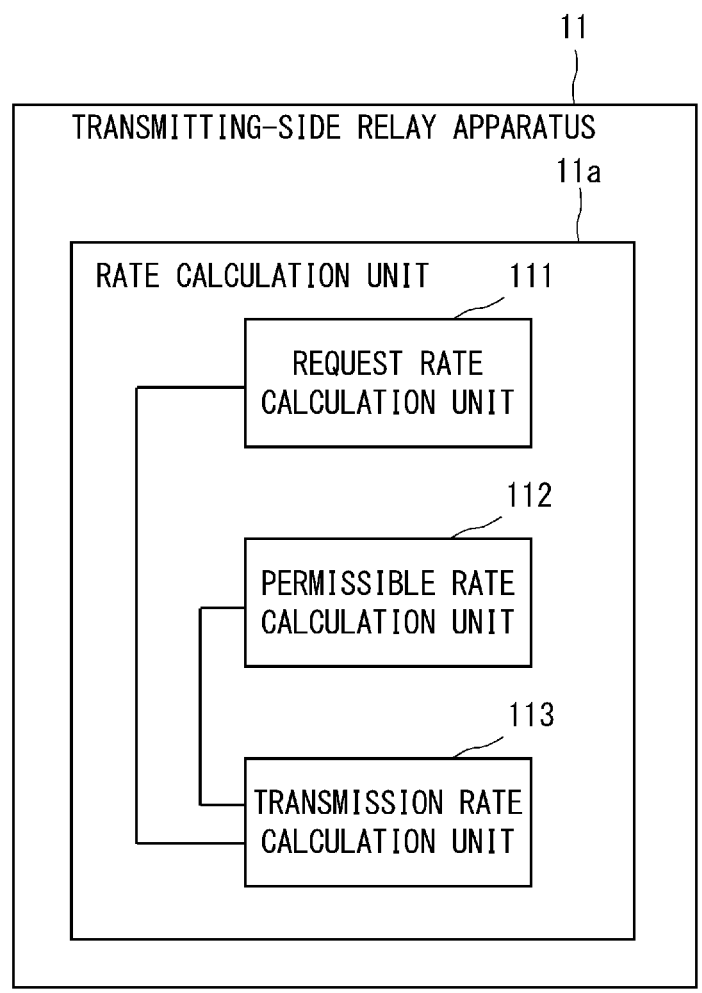
FIG. 1 is a block diagram illustrating a transmitting-side relay apparatus according to an example embodiment.

Hereinbelow, example embodiments of the present disclosure will be described with reference to the drawings. In the drawings, the identical reference symbols denote identical structural elements and the redundant explanations thereof are omitted where appropriate to clarify the explanation.

Example Embodiment

Configurations of a transmitting-side relay apparatus and a system according to an example embodiment will be described.

FIG. 1 is a block diagram illustrating a transmitting-side relay apparatus according to the example embodiment.

Figure 2:
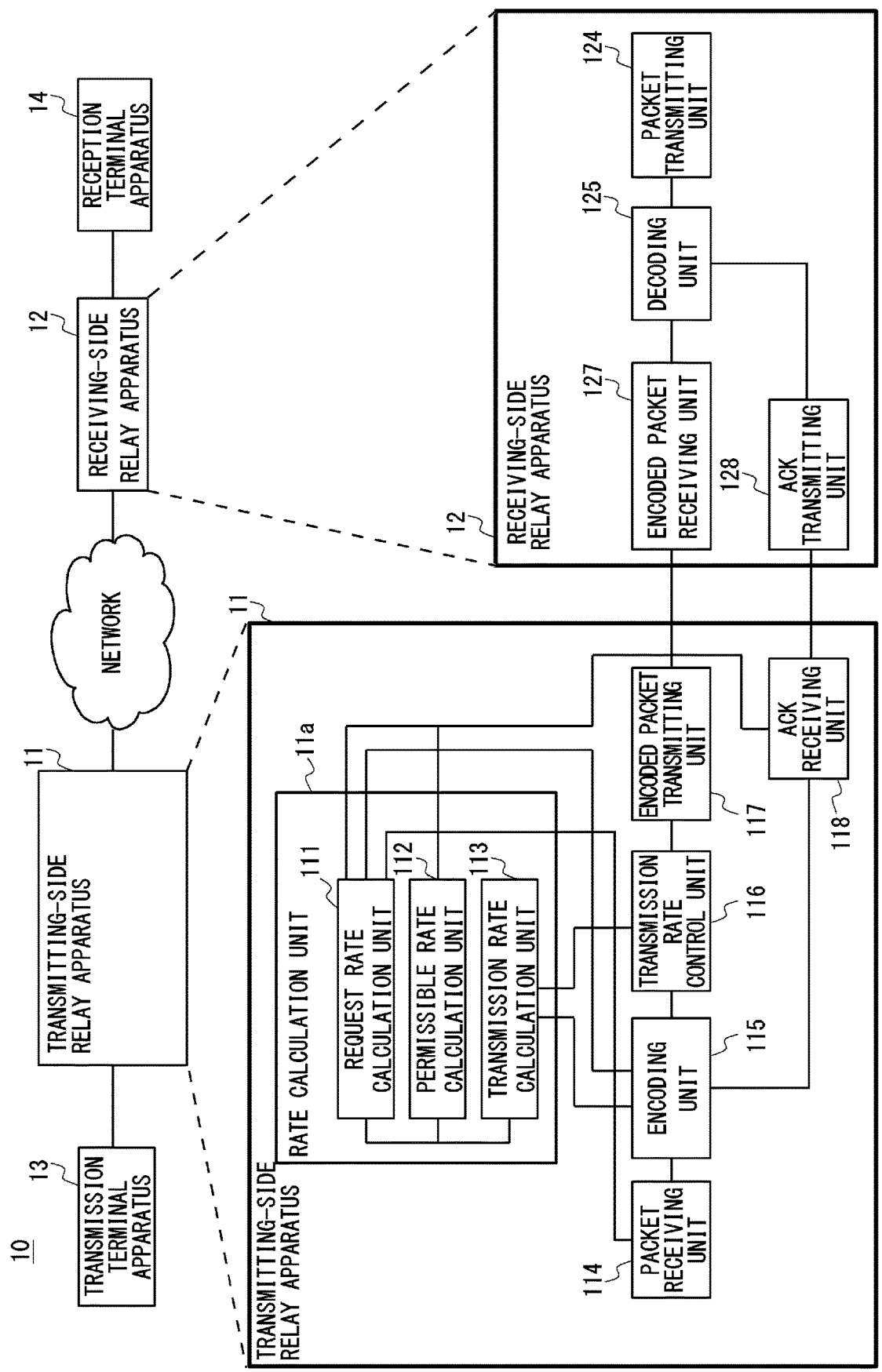
FIG. 2 is a block diagram illustrating a system according to an example embodiment.

FIG. 2 is a block diagram illustrating a system according to the example embodiment.

As shown in FIG. 1, a transmitting-side relay apparatus 11 according to the example embodiment includes a rate calculation unit 11a. The rate calculation unit 11a includes a request rate calculation unit 111, a permissible rate calculation unit 112, and a transmission rate calculation unit 113.

As shown in FIG. 2, the system 10 according to the example embodiment includes a transmission terminal apparatus 13, the transmitting-side relay apparatus 11, a receiving-side relay apparatus 12, and a reception terminal apparatus 14.

The transmission terminal apparatus 13 transmits input packets to the transmitting-side relay apparatus 11.

The transmitting-side relay apparatus 11 receives the input packets from the transmission terminal apparatus 13, encodes the input packets to thereby generate encoded packets, and transmits the generated encoded packets to the receiving-side relay apparatus 12 via a network.

An encoding scheme is, for example, a rateless encoding scheme.

The request rate calculation unit 111 of the transmitting-side relay apparatus 11 calculates the reception rate of the input packets input to the transmitting-side relay apparatus 11. The reception rate is, for example, the number of input packets that have arrived per unit time.

The request rate calculation unit 111 calculates an encoding loss rate when the input packets are encoded to generate encoded packets. The encoding loss rate is calculated, for example, from the number of packets that are encoded all at once. Further, the encoding loss rate may be calculated from the number of redundant codes that are necessary in decoding the encoded packets.

The request rate calculation unit 111 calculates the packet loss rate of the encoded packets in the receiving-side relay apparatus 12. The packet loss rate may be calculated, for instance, from a sequence number of each encoded packet included in ACK for notifying completion of decoding transmitted from the receiving-side relay apparatus 12. The request rate calculation unit 111 performs, for instance, determination that the encoded packet corresponding to the sequence number of the packet for which ACK could not be received has been lost (a loss) when the encoded packet is transmitted to the receiving-side relay apparatus 12. Then, the request rate calculation unit 111 may determine (the number of encoded packets lost per unit time/the total number of transmitted packets per unit time) as the packet loss rate.

The request rate calculation unit 111 calculates the request rate of the encoded packets based on the reception rate, the encoding loss rate, and the packet loss rate. The specific formula for calculating the request rate will be described later.

Note that the packet loss may sometimes be referred to as a network loss (NW loss).

The permissible rate calculation unit 112 calculates a delay time indicating the time period from the time of generation of the input packet to the time of reception of the encoded packet by the receiving-side relay apparatus 12. The permissible rate calculation unit 112 receives, for instance, the packet number, the generation time of the packet, and the reception time at which the packet is received by the receiving-side relay apparatus 12 from the receiving-side relay apparatus 12 via an ACK receiving unit 118 to be described later. The permissible rate calculation unit 112 may, then, calculate the delay time based on these information. The permissible rate calculation unit 112 calculates the permissible rate of the encoded packet based on at least one of the calculated delay time and the packet loss rate calculated by the request rate calculation unit 111.

Note that the permissible rate calculation unit 112 may calculate the permissible rate (the frequency band) at which the network does not get congested from the reception of ACK.

The transmission rate calculation unit 113 calculates the predetermined transmission rate for transmitting the encoded packets based on the request rate calculated by the request rate calculation unit 111 and the permissible rate calculated by the permissible rate calculation unit 112. The predetermined transmission rate is, for instance, the number of encoded packets to be transmitted per unit time.

Specifically, the transmission rate calculation unit 113 sets the request rate or the permissible rate whichever is smaller as the predetermined transmission rate.

Further, the transmitting-side relay apparatus 11 further includes a packet receiving unit 114, an encoding unit 115, a transmission rate control unit 116, and an encoded packet transmitting unit 117, and the ACK receiving unit 118.

The packet receiving unit 114 receives input packets. The encoding unit 115 encodes the input packets based on the predetermined transmission rate to generate encoded packets. The transmission rate control unit 116 performs control so that the transmission rate of the encoded packets is set to be the predetermined transmission rate. The encoded packet transmitting unit 117 transmits the encoded packets to the receiving-side relay apparatus 12.

Instead of the request rate calculation unit 111, the receiving-side relay apparatus 12 may calculate the packet loss rate, and the ACK receiving unit 118 may receive, from the receiving-side relay apparatus 12, the delay time indicating the time period from the time of generation of the input packet to the time of reception of the encoded packet by the receiving-side relay apparatus 12.

The receiving-side relay apparatus 12 receives the encoded packet from the transmitting-side relay apparatus 11 and transmits an output packet obtained by decoding the encoded packet to the reception terminal apparatus 14.

The receiving-side relay apparatus 12 includes an encoded packet receiving unit 127, a decoding unit 125, a packet transmitting unit 124, and an ACK transmitting unit 128.

The encoded packet receiving unit 127 receives the encoded packets from the transmitting-side relay apparatus 11. The decoding unit 125 decodes the encoded packets and generates the output packets. The packet transmitting unit 124 transmits the output packets to the reception terminal apparatus 14.

The receiving-side relay apparatus 12 may calculate the packet loss rate instead of the request rate calculation unit 111, and the ACK transmitting unit 128 may transmit, to the transmitting-side relay apparatus 11, the delay time and the packet loss rate.

The reception terminal apparatus 14 receives the output packets from the receiving-side relay apparatus 12.

Here, an operation of a rateless code will be described.

Figure 3:
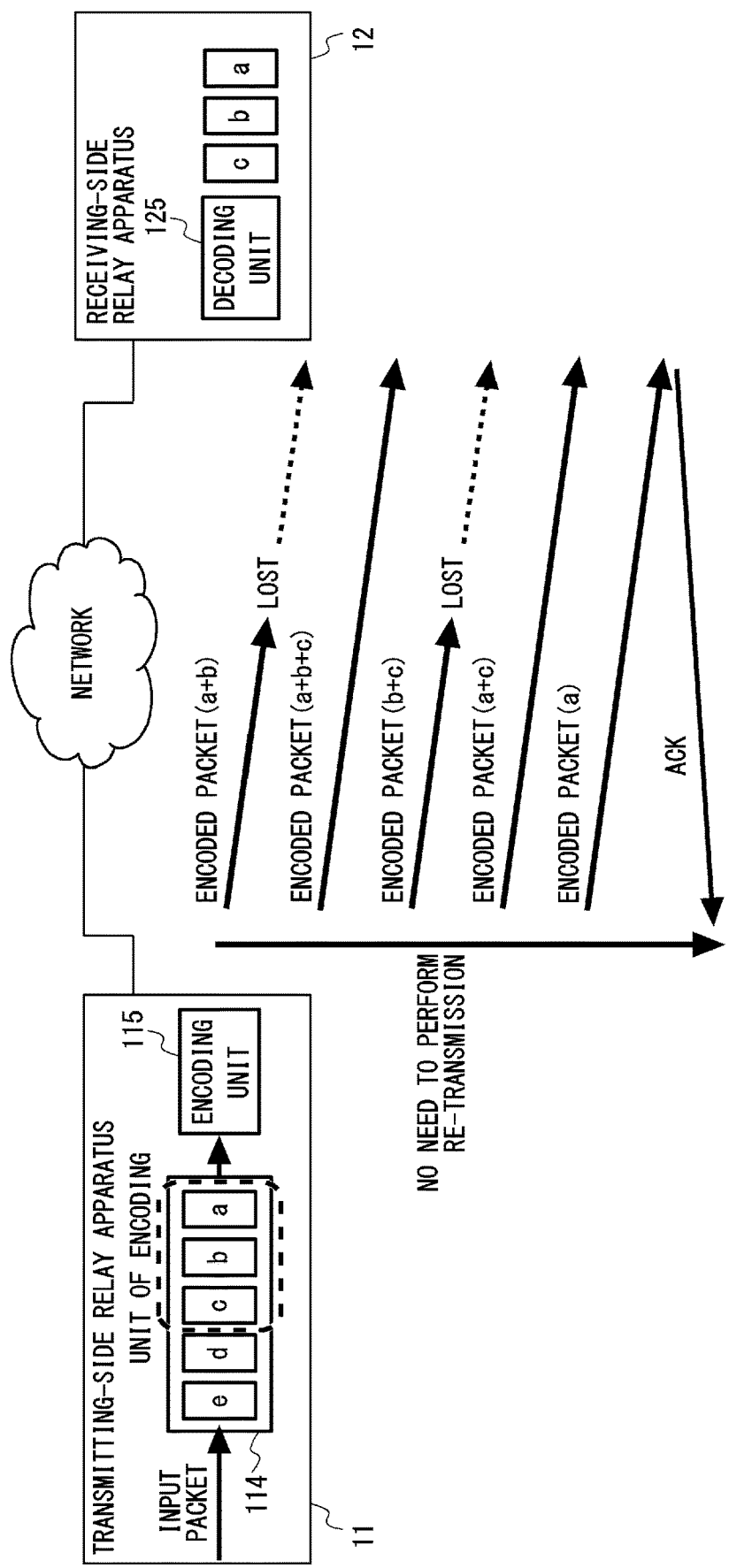
FIG. 3 is a schematic diagram illustrating an operation of a rateless code.

FIG. 3 is a schematic diagram illustrating an operation of a rateless code.

As shown in FIG. 3, the transmitting-side relay apparatus 11 transmits, to the receiving-side relay apparatus 12, the encoded packets in the order of an encoded packet (a+b), an encoded packet (a+b+c), an encoded packet (b+c), an encoded packet (a+c), and an encoded packet (a). Here, the symbol "+" refers to excusive OR (XOR). For instance, the encoded packet (a+b) indicate exclusive or of the input packet a and the input packet b.

In this example, it is assumed that the encoded packet (a+b) and the encoded packet (b+c) are lost in the course of the transmission. In this case, the number of input packets that are unknown is three, the input packet a, the input packet b, and the input packet c. Therefore, the receiving-side relay apparatus 12 can obtain the input packet a, the input packet b, and the input packet c based on the encoded packet (a+b+c), the encoded packet (a+c), and the encoded packet (a) that are the three received encoded packets. As described above, in the rateless code, by receiving the number of packets equal to the untimed number, the packets can be decoded.

A transmitting-side relay apparatus according to the example embodiment will be described.

Figure 4:
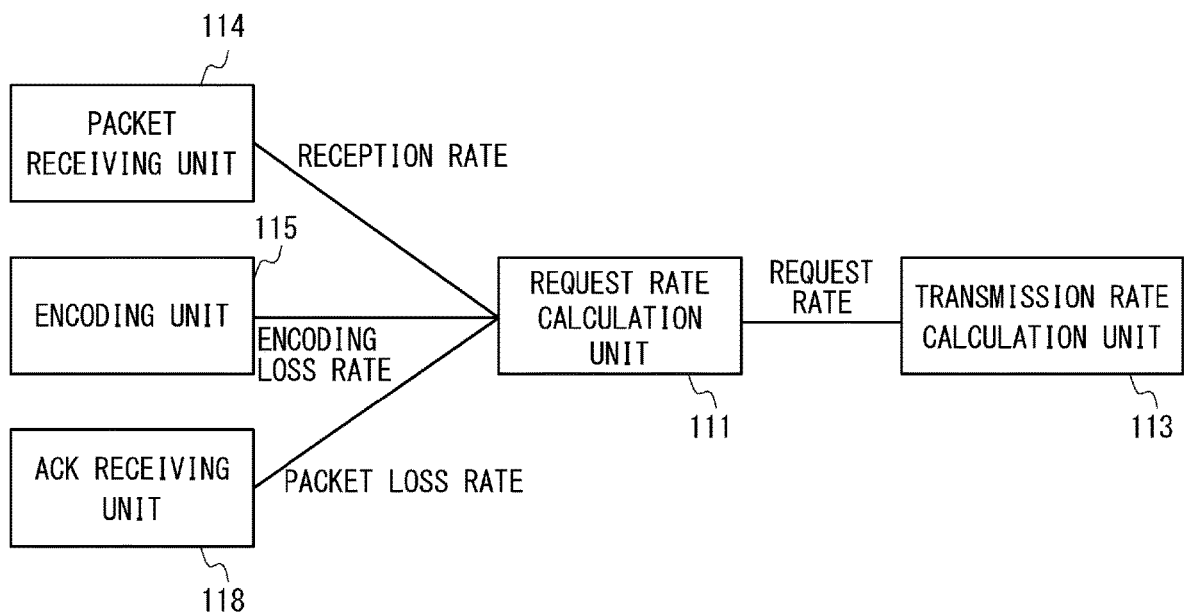
FIG. 4 is a block diagram illustrating an operation of a request rate calculation unit according to an example embodiment.

FIG. 4 is a block diagram illustrating an operation of a request rate calculation unit according to the example embodiment.

As shown in FIG. 4, the request rate calculation unit 111 acquires reception rate of the input packets input to the transmitting-side relay apparatus 11 from the packet receiving unit 114. The request rate calculation unit 111 acquires, from the encoding unit 115, the encoding loss rate when the input packets are encoded to generate encoded packets. The request rate calculation unit 111 acquires the packet loss rate of the encoded packets in the receiving-side relay apparatus 12 from the ACK receiving unit 118.

The request rate calculation unit 111 calculates, using the reception rate, the encoding loss rate, and the packet loss rate, the request rate in which the encoding loss rate and the packet loss rate in accordance with the reception rate of the input packets are taken into account, and notifies the transmission rate calculation unit 113 of the calculated request rate.

The specific formula of the request rate is as follows.

Request rate=Reception rate×(1+encoding loss rate+ packet loss rate)

Here, (1+encoding loss rate+packet loss rate) is referred to as the redundancy rate.

That is, the request rate calculation unit 111 calculates the redundancy rate by adding a numerical value 1, the encoding loss rate, and the packet loss rate. The request rate calculation unit 111 calculates the request rate by multiplying the calculated redundancy rate by the reception rate. The request rate calculation unit 111 notifies the transmission rate calculation unit 113 of the calculated request rate.

Here, the encoding loss rate is calculated from, for instance, the number of packets that have been encoded all at once by the encoding unit 115. Further, the packet loss rate may, for instance, calculated from the sequence number of the packet included in ACK.

Note that the reception rate may also be referred to as an input rate or an arrival rate.

Figure 5:
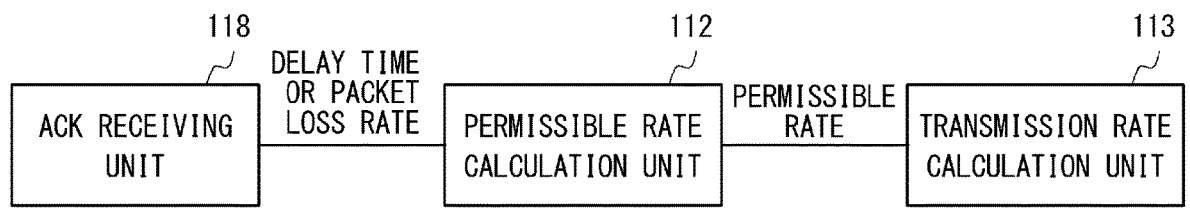
FIG. 5 is a block diagram illustrating a permissible rate calculation unit according to an example embodiment.

FIG. 5 is a block diagram illustrating a permissible rate calculation unit according to the example embodiment.

As shown in FIG. 5, the permissible rate calculation unit 112 calculates the permissible rate permitted by the network based on the delay time and the packet loss rate. The permissible rate calculation unit 112 transmits the calculated permissible rate to the transmission rate calculation unit 113. The permissible rate calculation unit 112 may receive the delay time and the packet loss rate from the ACK receiving unit 118.

The permissible rate calculation unit 112 may include a delay time correspondence table showing the correspondence between the delay time and the permissible rate. The permissible rate calculation unit 112 may have a packet loss correspondence table showing the correspondence between the packet loss rate and the permissible rate. The permissible rate calculation unit 112 may calculate the permissible rate based on the delay time correspondence table or the packet loss rate correspondence table.

Figure 6:
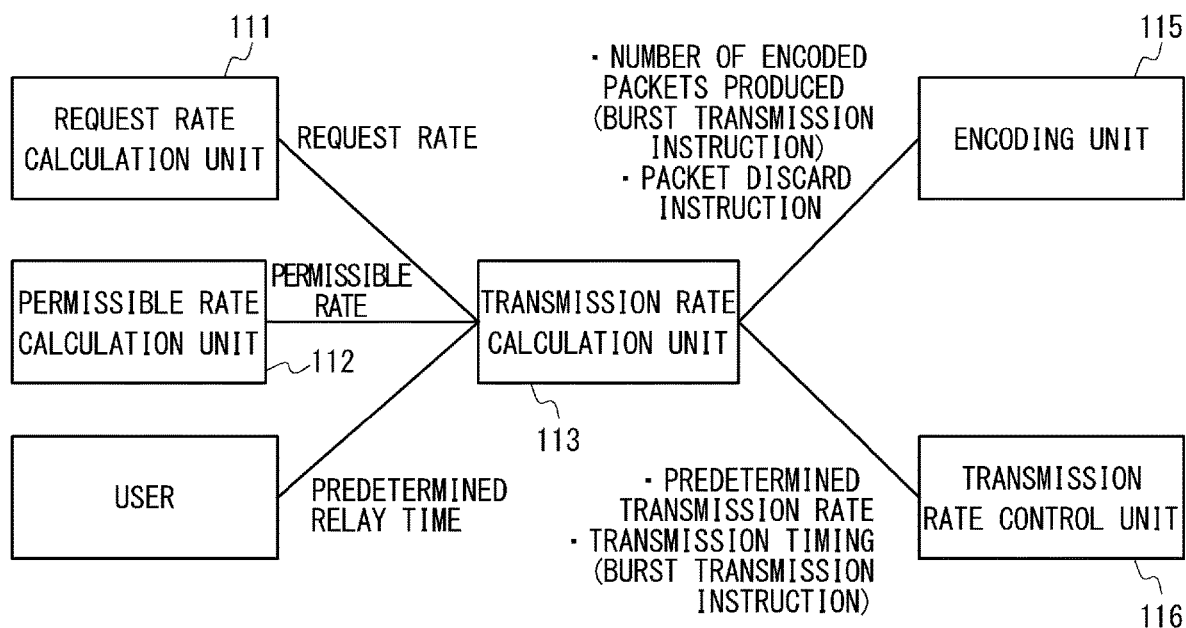
FIG. 6 is a block diagram illustrating a transmission rate calculation unit according to an example embodiment.

FIG. 6 is a block diagram illustrating a transmission rate calculation unit according to an example embodiment.

As shown in FIG. 6, the transmission rate calculation unit 113 acquires the request rate from the request rate calculation unit 111 and acquires the permissible rate from the permissible rate calculation unit 112. Further, the transmission rate calculation unit 113 acquires the predetermined relay time from the user. The transmission rate calculation unit 113 calculates the predetermined transmission rate for transmitting the encoded packets based on the request rate and the permissible rate.

The specific formula for calculating the predetermined transmission rate is as follows.

Predetermined transmission rate=min (request rate, permissible rate)

wherein, min (x, y) indicates a numerical value x or a numerical value y whichever is smaller.

That is, the transmission rate calculation unit 113 sets the request rate or the permissible rate, whichever is smaller, as the predetermined transmission rate.

Here, when the predetermined transmission rate is simply the request rate, there is a possibility that the relay time of the packets at the transmitting-side relay apparatus 11 may exceed the predetermined relay time set by the user. Therefore, the transmission rate calculation unit 113 may output, to the encoding unit 115 and the transmission rate control unit 116, a burst transmission instruction without exceeding the predetermined relay time. Note the relay time indicates, for instance, the time period from the time of generation of the input packet to the time of transmission of the encoded packet from the transmitting-side relay apparatus 11.

The encoding unit 115 dynamically changes the generation amount of the encoded packets generated in accordance with the instruction as regards the number of encoded packets to be generated (the burst transmission instruction) calculated by the transmission rate calculation unit 113.

The transmission rate control unit 116 changes the transmission timing of the encoded packets in burst mode or dynamically, such as at regular intervals, in accordance with the instruction (the burst transmission instruction) of the packet transmission timing calculated by the transmission rate calculation unit 113.

Note that the burst transmission instruction includes an instruction as regards the number of encoded packets to be generated and an instruction as regards the transmission timing of the encoded packets.

The transmission rate control unit 116 performs control so that the transmission rate of the encoded packets is equal to the predetermined transmission rate. The transmission rate control unit 116 performs control so that the relay time indicating the time period from the time of generation of the input packet to the time of transmission of the encoded packet from the transmitting-side relay apparatus 11 is set to be equal to or less than the predetermined relay time. The transmission rate control unit 116 performs, for instance, encoding and transmission of the encoded packet which has the relay time that is closer to the predetermined relay time in precedence over other input packets.

The transmission rate control unit 116 performs control so that the burst transmission of the encoded packets is performed from the one with the smaller relay time difference obtained by subtracting the relay time from the predetermined relay time. The transmission rate control unit 116 may perform control so that, for instance, the plurality of the encoded packets with the small relay time differences are collectively transmitted in burst mode.

Specifically, the transmission rate calculation unit 113 notifies the encoding unit 115 of the number of encoded packets to be generated (the volume of packets) to be transmitted by burst transmission. The encoding unit 115 outputs the encoded packets at a full rate until transmission of the notified number of the encoded packets is completed. The transmission is delayed until the next transmission timing so that an average transmission rate is achieved.

Note that a method of transmitting the encoded packets with a smaller relay time difference is, for instance, to use FIFO (First In First Out). If the encoded packets are loaded on the queue of the FIFO, the encoded packets are output in the order of their arrival and thus the encoded packets are automatically transmitted from the one with the smaller relay time difference.

Here, a function of transmitting the encoded packets from the one with the smaller relay time difference will be described taking an example in which a plurality of the transmission terminal apparatuses 13 are connected to one transmitting-side relay apparatus 11.

Figure 7:
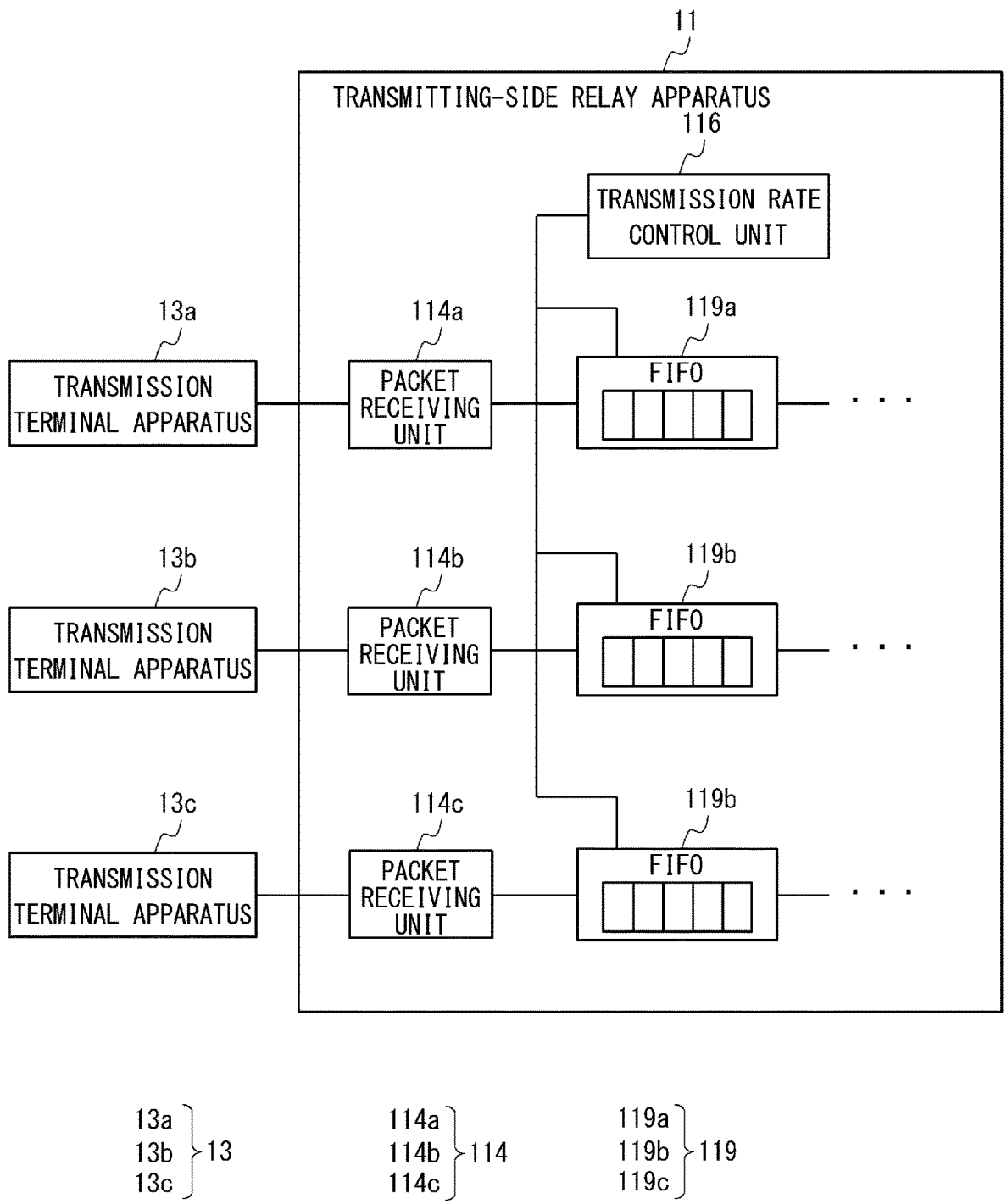
FIG. 7 is a block diagram illustrating a plurality of transmission terminal apparatuses and a transmitting-side relay apparatus.

FIG. 7 is a block diagram illustrating a plurality of transmission terminal apparatuses and a transmitting-side relay apparatus.

In FIG. 7, explanation will be given taking an example in which three transmission terminal apparatuses 13 are connected to one transmitting-side relay apparatus 11 and a FIFO 119 is connected posterior to the packet receiving unit 114. Note that in FIG. 7, the stages posterior to the FIFO 119 are omitted for the sake of simplifying the explanation.

As shown in FIG. 7, the transmitting-side relay apparatus 11 includes three packet receiving units 114 (a packet receiving unit 114a, a packet receiving unit 114b, and a packet receiving unit 114c) to be connected to respective three transmission terminal apparatuses 13 (a transmission terminal apparatus 13a, a transmission terminal apparatus 13b, and a transmission terminal apparatus 13c). The transmitting-side relay apparatus 11 includes the FIFOs 119 (a FIFO 119a, a FIFO 119b, and a FIFO 119c) connected to the three packet receiving units 114, respectively. In order to support the plurality of the transmission terminal apparatuses 13, the transmission rate control unit 116 is connected to the FIFOs 119. The queues of the three FIFOs 119 are present in parallel. Note that there is the encoding unit 115 in the stage posterior to the FIFO 119, but the explanation thereof will be omitted for the sake of simplifying the description.

The time period from the time of output of the input packet from the FIFO 119 to the time of transmission of the encoded packet from the encoded packet transmitting unit 117 is the prescribed processing time. Therefore, the transmission rate control unit 116 can control the relay time of a packet by controlling the time of output of the packet from the FIFO 119.

Specifically, the transmission rate control unit 116 performs control so that the input packets are sequentially output from the FIFO queues from the one with the smaller FIFO relay time difference. However, the FIFO relay time difference is the time difference obtained by subtracting the FIFO relay time from the predetermined FIFO relay time, and the FIFO relay time is the time period from the time of generation of the input packet to the time of output of the input packet from the FIFO 119.

While in the present example embodiment, an explanation has been given of a case in which three transmission terminal apparatuses 13 are connected to the transmitting-side relay apparatus 11, the present disclosure is not limited thereto. The present example embodiment can be also be implemented in the case in which only one transmission terminal apparatus 13 transmits a plurality of packets of different types, each packet (input packet) being received by the packet receiving unit 114.

Note that when the relay time exceeds the predetermined relay time set by the user, the encoded packet exceeding the predetermined relay time is unnecessary and so the transmission rate calculation unit 113 notifies the encoding unit 115 of the packet discard instruction for discarding the unnecessary encoded packet. The encoding unit 115 discards the encoded packets which are retained in the encoding unit 115.

Further, the transmitting-side relay apparatus 11 may display an error message instead of discarding the encoded packets.

Note that the predetermined relay time may sometimes be referred to as the Dead line time. Further, in the example embodiments, as an example, an explanation has been given of a rateless code, and thus the encoding unit may sometimes be referred to as a rateless code encoding unit.

An effect of a transmitting-side relay apparatus according to an example embodiment will be described.

Figure 8:
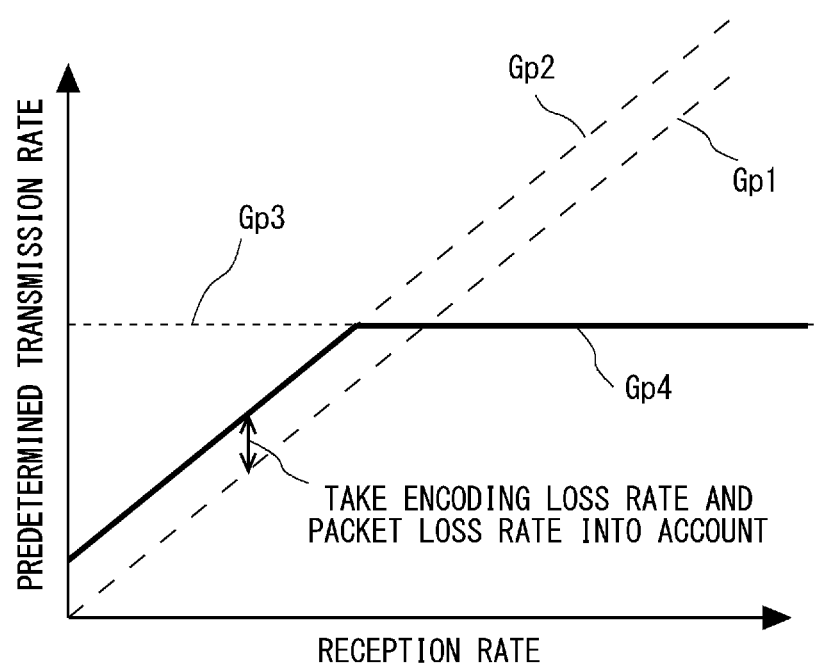
FIG. 8 is a graph illustrating an operation of a transmitting-side relay apparatus according to an example embodiment.

FIG. 8 is a graph illustrating an operation of a transmitting-side relay apparatus according to an example embodiment.

In FIG. 8, the horizontal axis represents the reception rate of the input packet and the vertical axis represents the predetermined transmission rate (the transmission rate) of the encoded packet.

In FIG. 8, graph Gp1 is a graph of the reception rate, graph Gp2 is a graph of the request rate, graph Gp3 is a graph of the permissible rate, and graph Gp4 is a graph of the predetermined transmission rate.

As shown in FIG. 8, the transmitting-side relay apparatus 11 according to the example embodiment operates such that the predetermined transmission rate shown by the graph Gp4 is made to be equal to the request rate shown by the graph Gp2 or the permissible rate shown by the graph Gp3 whichever is smaller.

Figure 9:
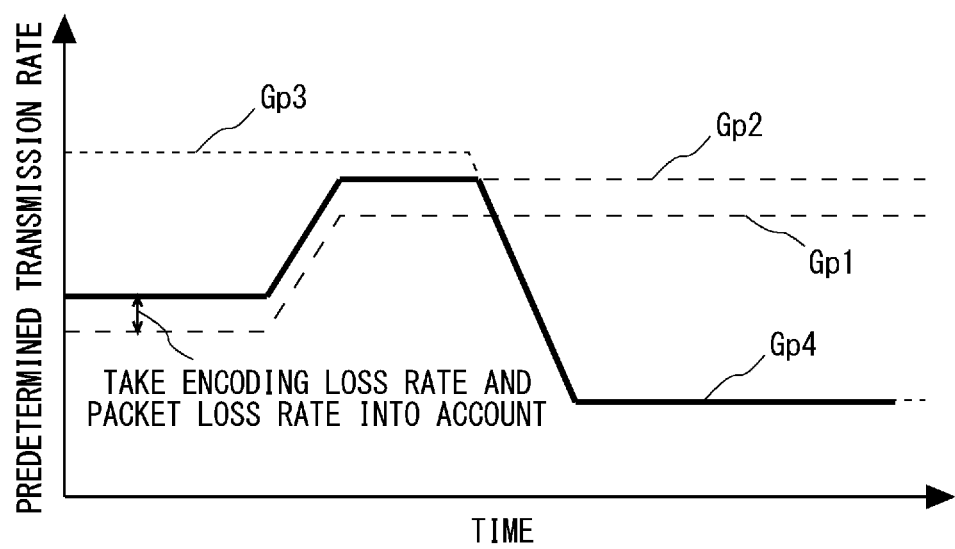
FIG. 9 is a graph illustrating an operation of a transmitting-side relay apparatus according to an example embodiment.

FIG. 9 is a graph illustrating an operation of a transmitting-side relay apparatus according to an example embodiment.

In FIG. 9, the horizontal axis represents time and the vertical axis represents the predetermined transmission rate (the transmission rate) of the encoded packet.

In FIG. 9, graph Gp1 is a graph of the reception rate, graph Gp2 is a graph of the request rate, graph Gp3 is a graph of the permissible rate, and graph Gp4 is a graph of the predetermined transmission rate.

As shown in FIG. 9, the transmitting-side relay apparatus 11 according to the example embodiment operates such that the predetermined transmission rate shown by the graph Gp4 is made to be equal to the request rate shown by the graph Gp2 or the permissible rate shown by the graph Gp3 whichever is smaller.

As shown in FIGS. 8 and 9, the transmitting-side relay apparatus 11 operates such that the predetermined transmission rate is made to be equal to the request rate or the permissible rate whichever is smaller. By this configuration, the likelihood that the transmission rate of the rateless code will increase until the network gets congested will be reduced. Further, no more communication resources than necessary are used. As a result, according to the example embodiment, it is possible to provide a transmitting-side relay apparatus, a system, a method, and a program, each adapted to reduce congestions in a network while appropriately using a communication resource for a network-based communication.

Note that while in the example embodiments, an explanation has been given using an example in which one transmission terminal apparatus 13 is connected to one transmitting-side relay apparatus 11, the present disclosure is not limited thereto. In the example embodiment, a plurality of the transmission terminal apparatuses 13 may be connected to one transmitting-side relay apparatus 11.

Further, while in the example embodiments, an explanation has been given using an example in which one reception terminal apparatus 14 is connected to one receiving-side relay apparatus 12, the present disclosure is not limited thereto. In the example embodiment, a plurality of the reception terminal apparatuses 14 may be connected to one receiving-side relay apparatus 12.

Further, when the transmission terminal apparatus 13 is connected to the transmitting-side relay apparatus 11 on an N-on-N basis instead on a one-on-one basis, N-number of rate calculation units 11a may be arranged in parallel in one transmitting-side relay apparatus 11 and the predetermined transmission rate may be calculated for each pair. N is a natural number equal to or greater than two.

Further, in the example embodiment, the permissible rate and the reception rate may be set to any fixed value in advance from the outside instead of being calculated dynamically. Therefore, the transmitting-side relay apparatus 11 may include an external interface for performing such setting.

Further, a relay apparatus including functions of the transmitting-side relay apparatus 11 and the receiving-side relay apparatus 12 may be provided, and the relay apparatus may be used in place of the transmitting-side relay apparatus 11 and the receiving-side relay apparatus 12.

In the above example embodiments, the present disclosure has been described as a hardware configuration, but the present disclosure is not limited thereto. It is also possible to implement processing of each structural element by causing a CPU (Central Processing Unit) to execute a computer program.

Note that in the aforementioned example embodiment, the program can be stored and provided to a computer using any type of non-transitory computer readable media. Non-transitory computer readable media include any type of tangible storage media. Examples of non-transitory computer readable media include magnetic storage media (specifically, floppy disks, magnetic tapes, and hard disk drives), optical magnetic storage media (specifically, magneto-optical disks), CD-ROM (Read Only Memory), CD-R, CD-R/W, and semiconductor memories (specifically, mask ROM, PROM (Programmable ROM), EPROM (Erasable PROM), flash ROM, RAM (Random Access Memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The present disclosure has been described with reference to the example embodiments. However, it should be noted that the present disclosure is not to be limited in any way by the example embodiments described above. The configuration and the details of the present disclosure can be modified in various ways that can be understood by one skilled in the art within the scope of present disclosure.

Note that the present disclosure is not limited to the aforementioned example embodiments and can be changed as appropriate without departing from the gist of the present disclosure.

The whole or part of the example embodiments disclosed above can be described as, but not limited to, the following supplementary notes.

(Supplementary Note 1)

A transmitting-side relay apparatus comprising:
  a request rate calculation unit configured to calculate, based on a transmission rate of an input packet input to the transmitting-side relay apparatus, an encoding loss rate at the time of encoding the input packet to generate an encoded packet, and a packet loss rate of the encoded packet in a receiving-side relay apparatus, a request rate of the encoded packet;
  a permissible rate calculation unit configured to calculate, based on at least one of a delay time indicating a time period from the time of generation of the input packet to the time of reception of the encoded packet by the receiving-side relay apparatus and the packet loss rate, a permissible rate of the encoded packet; and
  a transmission rate calculation unit configured to calculate a predetermined transmission rate for transmitting the encoded packet based on the request rate and the permissible rate.

(Supplementary Note 2)

The transmitting-side relay apparatus described in Supplementary note 1, wherein the transmission rate calculation unit is configured to set the request rate or the permissible rate, whichever is smaller, as the predetermined transmission rate.

(Supplementary Note 3)

The transmitting-side relay apparatus described in Supplementary note 1 or 2, wherein the request rate calculation unit is configured to
  calculate a redundancy rate by adding up a numerical value 1, the encoding loss rate, and the packet loss rate, and
  calculate the request rate by multiplying the redundancy rate by the reception rate.

(Supplementary Note 4)

The transmitting-side relay apparatus described in any one of Supplementary notes 1 to 3, wherein the permissible rate calculation unit
  has a delay time correspondence table showing correspondence between the delay time and the permissible rate,
  has a packet loss rate correspondence table showing correspondence between the packet loss rate and the permissible rate, and
  is configured to calculate the permissible rate based on the delay time correspondence table or the packet loss rate correspondence table.

(Supplementary Note 5)

The transmitting-side relay apparatus described in any one of Supplementary notes 1 to 4, further comprising transmission rate control unit configured to perform control so that a transmission rate of the encoded packet is set to be the predetermined transmission rate, wherein
  the transmission rate control unit is configured to perform control so that the relay time indicating the time period from the time of generation of the input packet to the time of transmission of the encoded packet from the transmitting-side relay apparatus is set to be equal to or less than the predetermined relay time.

(Supplementary Note 6)

The transmitting-side relay apparatus described in Supplementary note 5, wherein the transmission rate control unit is configured to perform control so that the encoded packet is transmitted from the transmitting-side relay apparatus with the smaller relay time difference obtained by subtracting the relay time from the predetermined relay time.
(Supplementary Note 7)

The transmitting-side relay apparatus described in Supplementary note 5 or 6, wherein the transmission rate calculation unit is configured to output, when the relay time exceeds the predetermined relay time, an instruction to discard the encoded packet which has exceeded the predetermined relay time.
(Supplementary Note 8)

The transmitting-side relay apparatus described in any one of Supplementary notes 1 to 7, wherein a scheme for performing the encoding is a rateless encoding scheme.
(Supplementary Note 9)

The transmitting-side relay apparatus described in any one of Supplementary notes 1 to 8, further comprising a packet receiving unit configured to receive the input packet.
(Supplementary Note 10)

The transmitting-side relay apparatus described in any one of Supplementary notes 1 to 9, further comprising an encoding unit configured to perform the encoding of the input packet and generate the encoded packet.
(Supplementary Note 11)

The transmitting-side relay apparatus according to any one of Supplementary notes 1 to 10, further comprising an encoded packet transmission unit configured to transmit the encoded packet to the receiving-side relay apparatus.
(Supplementary Note 12)

The transmitting-side relay apparatus according to any one of Supplementary notes 1 to 10, further comprising an ACK receiving unit configured to receive the delay time and the packet loss rate from the receiving-side relay apparatus.
(Supplementary Note 13)

A system comprising:
a transmission terminal apparatus;
a transmitting-side relay apparatus for receiving an input packet from the transmission terminal apparatus and transmitting an encoded packet;
a receiving-side relay apparatus for receiving the encoded packet and transmitting an output packet; and
a reception terminal apparatus for receiving the output packet,
the transmitting-side relay apparatus including:
a request rate calculation unit configured to calculate a request rate of the encoded packet based on a transmission rate of the input packet input to the transmitting-side relay apparatus, an encoding loss rate at the time of encoding the input packet to generate an encoded packet, and a packet loss rate of the encoded packet in the receiving-side relay apparatus;
a permissible rate calculation unit configured to calculate a permissible rate of the encoded packet based on at least one of a delay time indicating a time period from the time of generation of the input packet to the time of reception of the encoded packet by the receiving-side relay apparatus and the packet loss rate; and
a transmission rate calculation unit configured to calculate a predetermined transmission rate for transmitting the encoded packet based on the request rate and the permissible rate, the receiving-side relay apparatus including:
an encoded packet receiving unit configured to receive the encoded packet from the transmission-side relay apparatus;
a decoding unit configured to decode the encoded packet to generate the output packet;
a packet transmitting unit configured to transmit the output packet to the reception terminal apparatus; and
an ACK transmitting unit configured to transmit the delay time and the packet loss rate to the transmitting-side relay apparatus.
(Supplementary Note 14)

The system according to Supplementary note 13, wherein the transmission rate calculation unit is configured to set the request rate or the permissible rate, whichever is smaller, as the predetermined transmission rate.
(Supplementary Note 15)

A method comprising:
calculating, based on a transmission rate of an input packet input to the transmitting-side relay apparatus, an encoding loss rate at the time of encoding the input packet to generate an encoded packet, and a packet loss rate of the encoded packet in the receiving-side relay apparatus, a request rate of the encoded packet;
calculating a permissible rate of the encoded packet based on at least one of a delay time indicating a time period from the time of generation of the input packet to the time of reception of the encoded packet by the receiving-side relay apparatus and the packet loss rate; and
calculating a predetermined transmission rate for transmitting the encoded packet based on the request rate and the permissible rate.
(Supplementary Note 16)

A program for causing a computer to execute the processes of:
calculating, based on a transmission rate of an input packet input to a transmitting-side relay apparatus, an encoding loss rate at the time of encoding the input packet to generate an encoded packet, and a packet loss rate of the encoded packet in the receiving-side relay apparatus, a request rate of the encoded packet;
calculating a permissible rate of the encoded packet based on at least one of a delay time indicating a time period from the time of generation of the input packet to the time of reception of the encoded packet by the receiving-side relay apparatus and the packet loss rate; and
calculating a predetermined transmission rate for transmitting the encoded packet based on the request rate and the permissible rate.

The present disclosure has been described with reference to the example embodiments. However, it should be noted that the present disclosure is to be limited in any way by the example embodiments described above. The configuration and details of the present disclosure can be modified in various ways within the scope of the disclosure which can be understood by a skilled person in the art.

This application is based upon and claims the benefit of priority from Japanese patent application No. 2019-175433, filed on Sep. 26, 2019, the entire contents of which are incorporated herein by reference.

REFERENCE SIGNS LIST

10 . . . SYSTEM
11 . . . TRANSMITTING-SIDE RELAY APPARATUS
11A . . . RATE CALCULATION UNIT
111 . . . REQUEST RATE CALCULATION UNIT

112 . . . PERMISSIBLE RATE CALCULATION UNIT
113 . . . TRANSMISSION RATE CALCULATION UNIT
114, 114a, 114b, 114c . . . PACKET RECEIVING UNIT
115 . . . ENCODING UNIT
116 . . . TRANSMISSION RATE CONTROL UNIT
117 . . . ENCODED PACKET TRANSMITTING UNIT
118 . . . ACK RECEIVING UNIT
119, 119a, 119b, 119c . . . FIFO
12 . . . RECEIVING-SIDE RELAY APPARATUS
124 . . . PACKET TRANSMITTING UNIT
125 . . . DECODING UNIT
127 . . . ENCODED PACKET RECEIVING UNIT
128 . . . ACK TRANSMITTING UNIT
13, 13a, 13b, 13c . . . TRANSMISSION TERMINAL APPARATUS
14 . . . RECEPTION TERMINAL APPARATUS
Gp1 . . . GRAPH OF RECEPTION RATE
Gp2 . . . GRAPH OF REQUEST RATE
Gp3 . . . GRAPH OF PERMISSIBLE RATE
Gp4 . . . GRAPH OF PREDETERMINED TRANSMISSION RATE

What is claimed is:

1. A transmitting-side relay apparatus comprising:
at least one memory storing instructions, and
at least one processor configured to execute the instructions to;
calculate, based on a transmission rate of an input packet input to the transmitting-side relay apparatus, an encoding loss rate at the a time of encoding the input packet to generate an encoded packet, and a packet loss rate of the encoded packet in a receiving-side relay apparatus, a request rate of the encoded packet;
calculate, based on at least one of a delay time indicating a time period from the a time of generation of the input packet to a time of reception of the encoded packet by the receiving-side relay apparatus and the packet loss rate, a permissible rate of the encoded packet;
calculate, a predetermined transmission rate for transmitting the encoded packet based on the request rate and the permissible rate;
have a delay time correspondence table showing correspondence between the delay time and the permissible rate;
have a packet loss rate correspondence table showing correspondence between the packet loss rate and the permissible rate; and
calculate the permissible rate based on the delay time correspondence table or the packet loss rate correspondence table.

2. The transmitting-side relay apparatus according to claim 1, wherein the at least one processor configured to execute the instructions to set the request rate or the permissible rate, whichever is smaller, as the predetermined transmission rate.

3. The transmitting-side relay apparatus according to claim 1, wherein the at least one processor configured to execute the instructions to
calculate a redundancy rate by adding up a numerical value 1, the encoding loss rate, and the packet loss rate, and
calculate the request rate by multiplying the redundancy rate by the a reception rate.

4. The transmitting-side relay apparatus according to claim 1, wherein the at least one processor further configured to execute the instructions to perform control so that a transmission rate of the encoded packet is set to be the predetermined transmission rate, wherein the at least one processor configured to execute the instructions to perform control so that a relay time indicating the time period from the time of generation of the input packet to a time of transmission of the encoded packet from the transmitting-side relay apparatus is set to be equal to or less than a predetermined relay time.

5. The transmitting-side relay apparatus according to claim 4, wherein the at least one processor configured to execute the instructions to perform control so that the encoded packet is transmitted from the transmitting-side relay apparatus with the smaller relay time difference obtained by subtracting the relay time from the predetermined relay time.

6. The transmitting-side relay apparatus according to claim 4, wherein the at least one processor configured to execute the instructions to output, when the relay time exceeds the predetermined relay time, an instruction to discard the encoded packet which has exceeded the predetermined relay time.

7. The transmitting-side relay apparatus according to claim 1, wherein a scheme for performing the encoding is a rateless encoding scheme.

8. The transmitting-side relay apparatus according to claim 1, the at least one processor further configured to execute the instructions to receive the input packet.

9. The transmitting-side relay apparatus according to claim 1, the at least one processor further configured to execute the instructions to perform the encoding of the input packet and generating the encoded packet.

10. The transmitting-side relay apparatus according to claim 1, the at least one processor further configured to execute the instructions to transmit the encoded packet to the receiving-side relay apparatus.

11. The transmitting-side relay apparatus according to claim 1, the at least one processor further configured to execute the instructions to receive the delay time and the packet loss rate from the receiving-side relay apparatus.

12. A system comprising:
a transmission terminal apparatus;
a transmitting-side relay apparatus for receiving an input packet from the transmission terminal apparatus and transmitting an encoded packet;
a receiving-side relay apparatus for receiving the encoded packet and transmitting an output packet; and
a reception terminal apparatus for receiving the output packet,
the transmitting-side relay apparatus including:
at least one first-memory storing instructions, and
at least one first-processor configured to execute the instructions to;
calculate a request rate of the encoded packet based on a transmission rate of the input packet input to the transmitting-side relay apparatus, an encoding loss rate at a time of encoding the input packet to generate an encoded packet, and a packet loss rate of the encoded packet in the receiving-side relay apparatus;
calculate a permissible rate of the encoded packet based on at least one of a delay time indicating a time period from a time of generation of the input packet to a time of reception of the encoded packet by the receiving-side relay apparatus and the packet loss rate;
calculate a predetermined transmission rate for transmitting the encoded packet based on the request rate and the permissible rate;

have a delay time correspondence table showing correspondence between the delay time and the permissible rate;

have a packet loss rate correspondence table showing correspondence between the packet loss rate and the permissible rate; and calculate the permissible rate based on the delay time correspondence table or the packet loss rate correspondence table, the receiving-side relay apparatus including:

at least one second-memory storing instructions, and at least one second-processor configured to execute the instructions to;

receive the encoded packet from the transmitting-side relay apparatus;

decode the encoded packet to generate the output packet;

transmit the output packet to the reception terminal apparatus; and transmit the delay time and the packet loss rate to the transmitting-side relay apparatus.

13. The system according to claim 12, wherein the at least one first-processor configured to execute the instructions to set the request rate or the permissible rate, whichever is smaller, as the predetermined transmission rate.

14. A method performed by a transmitting-side relay apparatus, the method comprising:

calculating, based on a transmission rate of an input packet input to the transmitting-side relay apparatus, an encoding loss rate at a time of encoding the input packet to generate an encoded packet, and a packet loss rate of the encoded packet in a receiving-side relay apparatus, a request rate of the encoded packet;

calculating a permissible rate of the encoded packet based on at least one of a delay time indicating a time period from a time of generation of the input packet to a time of reception of the encoded packet by the receiving-side relay apparatus and the packet loss rate;

calculating a predetermined transmission rate for transmitting the encoded packet based on the request rate and the permissible rate;

having a delay time correspondence table showing correspondence between the delay time and the permissible rate;

having a packet loss rate correspondence table showing correspondence between the packet loss rate and the permissible rate; and calculating the permissible rate based on the delay time correspondence table or the packet loss rate correspondence table.

* * * * *